Apr. 17, 1923.

W. E. CURTIS

TIRE

Filed Nov. 18, 1921

1,451,977

Inventor

William E. Curtis,

By

Attorney

Patented Apr. 17, 1923.

1,451,977

UNITED STATES PATENT OFFICE.

WILLIAM E. CURTIS, OF WYANDOTTE, MICHIGAN.

TIRE.

Application filed November 18, 1921. Serial No. 516,021.

*To all whom it may concern:*

Be it known that I, WILLIAM E. CURTIS, a citizen of the United States of America, residing at Wyandotte, in the county of Wayne and State of Michigan, have invented certain new and useful Improvements in Tires, of which the following is a specification, reference being had therein to the accompanying drawings.

This invention relates to tires and has special reference to that class of resilient vehicle tires that may be advantageously used on automobile and truck wheels, without employing inner pneumatic tubes or air cushioning means in connection with the tires.

The primary object of my invention is to provide a tire composed of a multiplicity of circumferentially arranged resilient units which may be assembled on a wheel rim or felly, and should a unit be injured a new one may be substituted therefor without the necessity of removing the inner tire.

Another object of this invention is to provide a tire consisting of a plurality of circumferentially arranged adjoining resilient units with each unit containing laminated springs for maintaining the unit distended and a retractile spring, cooperating with the other springs, in maintaining the configuration of the unit and thus resist any pressure which tends to distort the unit. It is through the co-operation of such springs that the unit is resilient and a multiplicity of such units can readily cooperate to insure easy riding of a vehicle on a rough surface.

A further advantage of my invention is to provide tire units that may be assembled to provide a tire of desired diameter or size, and each unit has its parts constructed so as to be easily assembled and manufactured at a comparatively small cost.

Other objects of my invention will hereinafter appear as the tire is better understood, and reference will now be had to the drawing, wherein—

The tire comprises a rim or annular support 1 provided with side flanges 2 and sets of circumferentially arranged openings 3.

Figure 1:
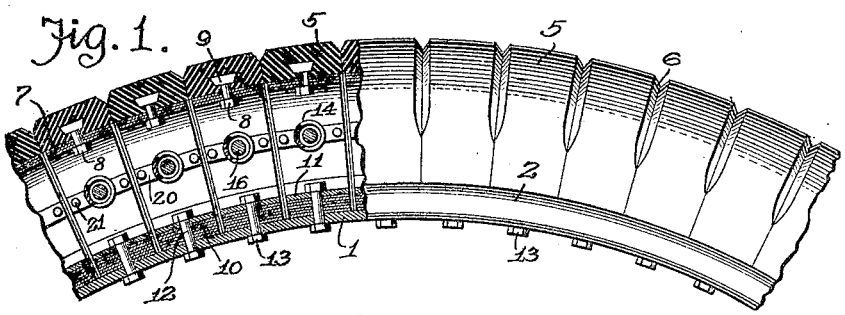
Figure 1 is a side elevation of a portion of the tire with certain units in longitudinal section.

Mounted on the rim 1 are the clencher edges 4 of a plurality of circumferentially arranged abutting tire units 5 preferably made of rubber, said units having thickened or reinforced tread portions with the edges of said tread portions beveled, as at 6. With the units 5 in abutting relation, as shown in Fig. 1, the beveled edges 6 will cooperate in providing transversely disposed grooves in the periphery of the tire and these grooves will increase the tractive or gripping qualifications of the tire.

In each unit is a laminated bowed spring 7 having its bowed portions connected by a screw bolt 8 or other fastening means to the middle portion of the unit, in which middle portion there is embedded a nut 9 into which the screw bolt 8 is screwed.

The leaves of the laminated spring 7 have overlapping apertured ends 10 on the rim 1 and mounted on these overlapping ends is a stud plate 11 having studs 12 extending through the apertures of the bowed spring and through the apertures 3 of the rim 1 so that nuts 13 may be mounted on the studs 12 of the plate 11 to anchor the ends of the bowed spring relative to the rim. The bowed spring maintains the unit distended against accidental collapse but permits of the unit yielding under pressure.

Figure 2:
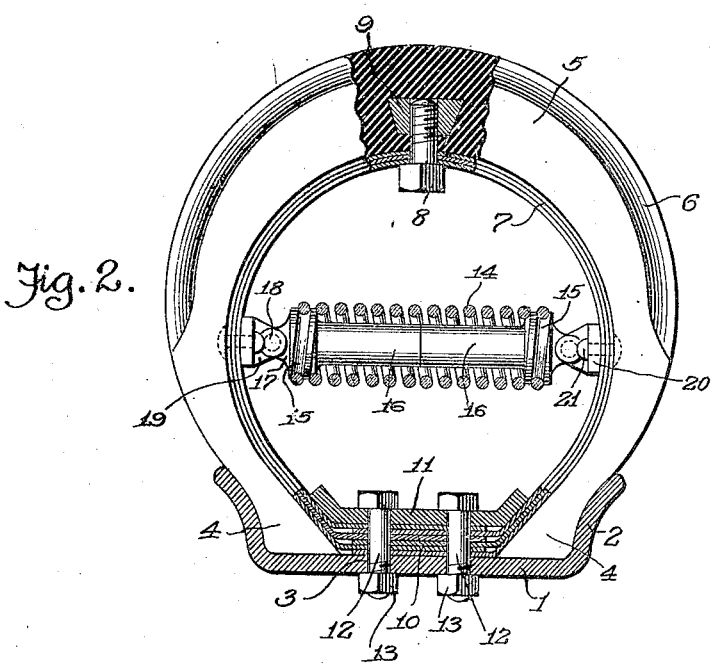
Fig. 2 is an enlarged cross sectional view of a portion of the tire showing one of the units partly broken away and partly in section.
Figure 3:
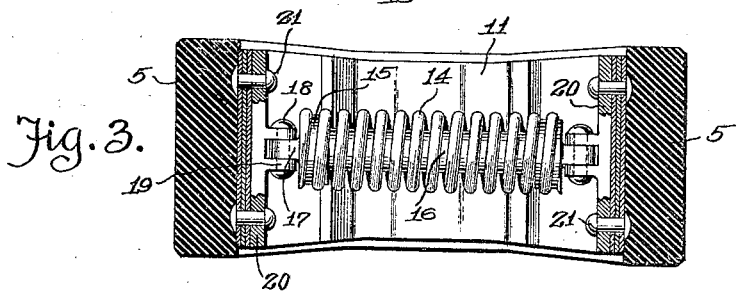
Fig. 3 is a horizontal sectional view of the tire unit.

Adding rigidly to the bowed spring of each unit is a coiled retractile spring 14 which has its end convolutions in screw-threaded engagement with the heads 15 of guide pins 16 extending into the ends of the coiled spring 14. The heads 15 have apertured lugs 17 pivotally connected by pins 18 to sets of apertured lugs 19 carried by plates 20 riveted or otherwise connected, as at 21 to opposed walls of the bowed spring 7. The coiled retractile spring extends transversely of the unit, as best shown in Fig. 2, and the retractile force of said spring will prevent excessive bulging of the sides of the bowed spring and the unit in which it is mounted.

Should anything happen to one of the units the nuts 13 can be removed and the unit bodily withdrawn from the rim 1, but with the units compactly assembled about the rim the tire will withstand rough usage and afford a greater degree of resiliency than an ordinary pneumatic tire.

One embodiment of my invention has been illustrated but it is to be understood that the structural elements are susceptible to such changes in size, shape and manner of assemblage as fall within the scope of the appended claim.

What I claim is:—

The combination of a rim and a tire, said tire including abutting, resilient units on said rim, a laminated bowed spring in each unit, said spring having its bowed portion connected to said unit and its ends overlapped and connected to said rim, a coiled retractile spring in each unit having its ends loosely connected to opposed walls of said bowed spring, and a studded plate mounted on the overlapped ends of the bowed spring to connect said ends to said rim.

In testimony whereof I affix my signature in presence of two witnesses.

WILLIAM E. CURTIS.

Witnesses:
ANNA M. DORR.
KARL H. BUTLER.